United States Patent Office 3,356,138
Patented Dec. 5, 1967

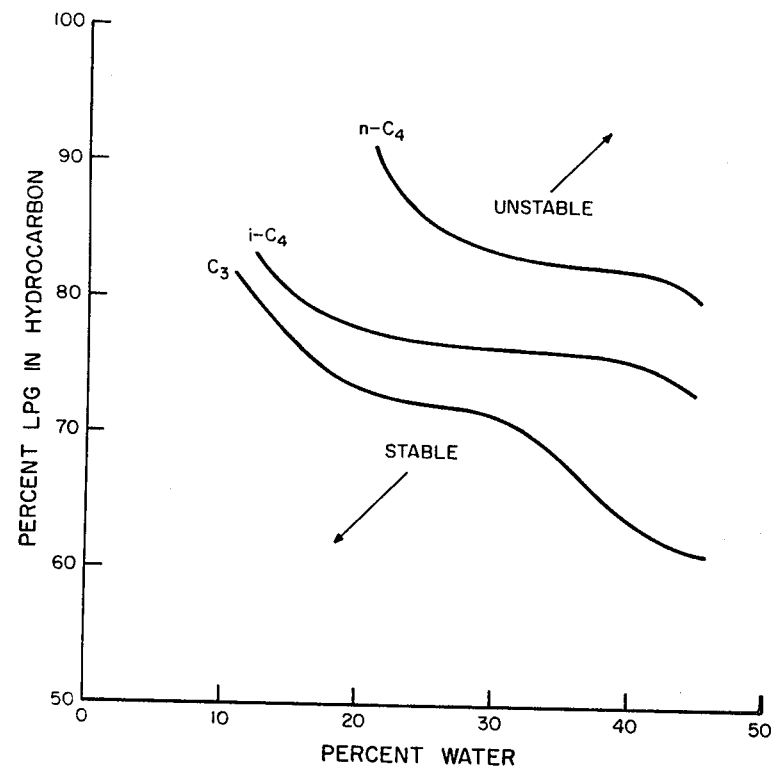

3,356,138
OIL RECOVERY PROCESS UTILIZING LIQUEFIED PETROLEUM GASES AND HEAVIER HYDROCARBONS
John A. Davis, Jr., Littleton, and Russell W. Olson, Denver, Colo., assignors to Marathon Oil Company, Findlay, Ohio, a corporation of Ohio
Filed Nov. 22, 1965, Ser. No. 509,013
8 Claims. (Cl. 166—9)

This invention relates to the use of microemulsions in oil recovery. More particularly, the invention relates to the use of microemulsions having an external phase of a mixture of liquefied petroleum gas (LPG) and higher molecular weight hydrocarbon in oil recovery.

Binder et al., United States Patents 3,149,669 and 3,208,517, and Meadors, United States Patent 3,208,515, teach the use of emulsions in secondary-type recovery. Holm et al., United States Patent 3,082,822; Jones, United States Patent 3,126,952; and Csaszar, United States Patent 3,163,214, teach the use of "soluble oils" in secondary oil recovery. Copending United States patent application Serial No. 506,603, filed November 5, 1965, by W. B. Gogarty and R. W. Olson, now U.S. Patent No. 3,301,325, teaches the use of microemulsions made up with LPG's in secondary-type oil recovery procedures.

The processes of this application and the prior art patents are all directed toward the recovery of maximum amounts of crude oil consistent with practical economics. The utilization of LPG's in the microemulsions of the above-mentioned copending application and the emulsions of Binder et al. Patent 3,208,517 provide an economic approach to flooding. However, the use of flooding media prepared from liquefied petroleum gases, while relatively economic, is limited by the amount of water which the LPG media can sorb. Further, the viscosity of the liquefied petroleum gas formulations is so low that often adverse mobilities are established between the crude in the formation and the flooding material.

We have now discovered that the amount of water sorbed by liquefied petroleum gas formulations can be increased substantially by incorporating in the liquefied petroleum gas compositions higher hydrocarbons. This fact is depicted in the attached stylized drawing showing the changes in water concentration required to form a two-phase system when related to LPG concentration of a microemulsion made up with a monosulfonate surfactant. The addition of these higher molecular weight hydrocarbons often enhances the viscosity of the systems formulated sufficiently to permit the systems to be used in many formations where such usage is otherwise impracticable. Further, the incorporation of even small amounts of higher molecular weight hydrocarbons in the liquefied petroleum gas microemulsions often aids appreciably in dissolving some types of surfactants, particularly oil-soluble alkylnaphthenic monosulfonates, in the hydrocarbon phase in order that the desired microemulsions can be formulated.

The process of this invention comprises injecting a microemulsion, utilizing a mixture of liquefied petroleum gas and higher molecular weight hydrocarbon as the external phase, into a subterranean formation through at least one injection means, driving said microemulsion toward at least one oil recovery means drilled into said formation, and recovering oil displaced by said microemulsion.

The microemulsions utilized in the process of this invention are phase stable and substantially transparent. They are, further, stable to the ions and fluids in the formation; i.e., they do not break in the presence of these materials. The microemulsions can contain additives to insure optimum recovery operations; for example, corrosion inhibitors can be used in sour fields and bactericides can be used where necessary.

Liquefied petroleum gas, as used here, encompasses individual liquefied hydrocarbons and mixtures of liquefied hydrocarbons having a boiling point less than about 10° C. at 760 mm. Hg. Ethane, propane, isobutane, butane, and neopentane are included among hydrocarbons coming within the above definition. Higher molecular weight hydrocarbons which are mixed with the liquefied petroleum gas include hydrocarbons having molecular weights lower than that of kerosene and higher than that of heavy fuel oil. Preferably, the hydrocarbons are not sour though crude petroleum from many formations can be readily utilized.

Microemulsions useful in the process of this invention contain from about 0 to about 45% water, from about 20 to about 80% LPG, from about 5 to about 40% higher molecular weight hydrocarbon, from about 5 to about 20% surfactant, and up to about 10% cosurfactant. Preferably, the microemulsions contain, by volume, from about 15 to about 35% water, from about 30 to about 60% LPG, from about 10 to about 30% higher molecular weight hydrocarbon, from about 7 to about 15% surfactant, and up to about 6% cosurfactant.

Surfactants which can be used include the various nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate.

We prefer to utilize preferentially oil-soluble anionic surfactants such as higher alkylaryl monosulfonates, particularly alkylnaphthenic monosulfonates, wherein the alkyl radical contains from about 10 to 20 carbon atoms. The sodium salts of dialkylsuccinates are also particularly desirable surfactants for use in making up the microemulsions. It is preferred that the alkyl radicals of the succinate compounds contain from about 6 to about 10 carbon atoms.

The type of microemulsion and surfactant utilized in the microemulsion depends upon the temperature of the formation and the hardness, including salinity, and pH of the connate water and the water used to make up the microemulsion. It would be futile to use a detergent such as sodium oleate in a formation containing relatively high concentrations of calcium and magnesium ions, as the precipitated calcium and magnesium soaps would plug the formation. Where there is a natural detergent in the crude, a surfactant having a similar ionic charge must be used to avoid precipitating an insoluble reaction product. Preferably, the microemulsion can emulsify large amounts of fresh water and has a low viscosity at the point where the microemulsion inverts to form a water-external emulsion.

Water utilized in making up the microemulsions of this invention is preferably soft. However, ordinary hard tap water and even relatively brackish waters can be used with surfactants which are not precipitated by the contaminating ions. Various salts can be included in the microemulsion composition to overcome problems arising out of the water sensitivity of a particular formation.

Techniques used in the preparation of microemulsions are widely known. The well-known hydrophile-lyophile balance technique is one means of deriving suitable compositions. Microemulsions are generally prepared by dissolving the surfactants and cosurfactants in the nonpolar constituent. However, surfactant can also be included in the polar constituent. The surfactant and cosurfactant can be dissolved in a petroleum fluid and water is incrementally added to the petroleum fluid with agitation. Alternately, all the substituents can be mixed at once.

While the amount of LPG and higher molecular weight hydrocarbon utilized in a particular composition will vary with the requirements of a particular subterranean formation to be flooded, it is preferred that the liquefied petroleum gas make up from about 30 to about 60%, by volume, of the microemulsion composition. The higher molecular weight hydrocarbon can make up from about 5 to about 40% of the microemulsion composition while preferably about 10 to about 30% higher molecular weight hydrocarbon is utilized.

The amount of microemulsion utilized in a particular formation varies with the volume of the formation being flooded. The amount of slug utilized increases, though the percent of pore volume decreases, with the volume of reservoir to be swept. Thus, 2.5–5.0% of pore volume are adequate to flood a 40–50-acre area, while 5–10% of pore volume are necessary for a 5–10-acre area.

We prefer to inject into the formation a slug of microemulsion bank material of from 1–20% and at least about 3% to about 10% of the pore volume of the formation. Thirty percent, or more, bank material can be utilized. However, such large banks can prove economically unattractive.

It is difficult to define the exact amount of microemulsion required in this process. Ideally, sufficient material should be used to provide a substantially continuous zone of microemulsion, at the perimeter of the area from which it is desired to recover petroleum crude, between the crude in the formation and the material used to drive the bank. Sometimes it may be more economical to use a small slug, expecting substantial breaks in the bank at the final perimeter, to obtain only a partial recovery of crude rather than to use a large slug and obtain a complete recovery in the swept area. The amount of bank required will also vary with the area to be swept. Crude viscosity, substantial variations in formation permeability, and other considerations also affect the pore volume to be used. Thus, increased amounts of bank material are required where the viscosity of the crude is high in order that the incremental drops in viscosity from the high viscosity at the leading edge to the low viscosity at the trailing edge will be small.

After injection of the bank is completed, a drive material is injected into the formation, usually through the same injection wells, to force the bank material through the formation and the crude ahead of the bank material. Water, which can contain salts in water-sensitive formations, is the preferred drive material. Other drive materials are also useful. Examples of such materials include nitrogen, carbon dioxide, and natural gas.

The following specific examples more fully illustrate our invention, but it is not intended that our invention be limited to the exact petroleum constituents, surfactants, alcohols, or procedures utilized. Rather, it is intended that all equivalents obvious to those skilled in the art be included within the scope of our invention as claimed.

EXAMPLE I

A flood was carried out in a Berea sandstone core approximately 1.22 m. long, 4.08 cm. in diameter, and having a pore volume of 495 cc. The core was saturated with a solution of 5000 p.p.m. calcium chloride in water. Thereafter, the core was flooded with Bradford crude oil having a viscosity of 4.5 cp. The core was again flooded with 5000 p.p.m. calcium chloride to obtain a residual oil saturation of 29.7% and a water saturation of 70.3%. The porosity of the core was found to be 0.202 and the permeability 279.9 md. A microemulsion made up of 57.36% hydrocarbon, 10.93% commercial sulfonate, 2.11% isopropanol, and 29.6% water containing 0.455 weight percent sodium sulfate was injected into the core at a rate designed to establish a rate of frontal movement of 1.92 ft./day. The hydrocarbon mixture contained 86% butane and 14% kerosene. A thickened water composition containing 500 p.p.m. Dow Chemical Company polyacrylamide, 1000 p.p.m. calcium chloride, and 50 p.p.m. $NH_4SCN$ was then injected into the core. At 1.2 pore volumes of injected fluid, the recovery was 53.7% of the crude and 23.7% of the injected hydrocarbon.

EXAMPLE II

A run was carried out in a Berea sandstone core, similar to that of Example I, having a pore volume of 484 cc. The core was initially flooded with 5000 p.p.m. calcium chloride and thereafter flooded with Bradford crude oil. After being water flooded with calcium chloride solution, the core had a residual oil saturation of 32.4%. The core had a porosity of 0.198 and a permeability of 251.7 md. Twenty percent of pore volume of the slug described in Example I was injected into the core followed by an infinite drive of the previously described thickened water. The flooding operation was carried out at a displacement rate of 1.964 ft./day. At 1.2 pore volumes injected fluids, 75.9% crude oil and 29.4% of the originally injected hydrocarbon were recovered.

EXAMPLE III

A hydrocarbon-surfactant solution was prepared from impure hydrocarbon gases and surfactant. The composition of the solution is as follows: 15.4% propane, 18.7% isobutane, 45.9% n-butane, and 20.0% of a monosulfonate surfactant. About 2% isopropanol was added to aid in the solution of the surfactant in the hydrocarbon. From this solution, a number of microemulsions were prepared. These microemulsions have the following compositions and properties at room temperatures:

(A) 51% surfactant solution; 4% isopropanol; 10% Hughes crude oil; and 35% water containing 3%, by weight, sodium sulfate, based on the active component of the surfactant. This composition is stable at room temperature, is uniform, and is transparent though some asphalts may precipitate.

(B) 56% surfactant solution; 4% isopropanol; 10% kerosene; and 30% water containing 3%, by weight, sodium sulfate. This microemulsion is uniform, clear, and stable.

(C) 51% hydrocarbon solution; 4% isopropanol; 10% kerosene; and 35% water containing 3% sodium sulfate. This solution is very clear and shows no phase separation.

(D) 38% surfactant solution; 15% kerosene; 4% isopropanol; and 43% water containing 3%, by weight, sodium sulfate. This solution is very clear and shows no phase separation.

(E) 43% surfactant solution; 5% light catalytic cycle oil; 5% pentane; 5% kerosene; 2% isopropanol; and 40% water containing 3%, by weight, sodium sulfate. The micro-emulsion is very clear and shows no phase separation.

EXAMPLE IV

A solution of propane and sulfonate at a volume ratio of 84:16 to which was added 4% isopropanol was mixed with an equal volume of a solution wherein kerosene was substituted for the propane. This mixture wa then used to make up a microemulsion containing 45% water which, in turn, contained 3% sodium sulfate. At room temperature, the microemulsion was stable and transparent.

EXAMPLE V

Isobutane was mixed with 15.2, volume percent, sulfonate and 5% isopropanol to form a hydrocarbon solution. A like solution was made up substituting kerosene for the isobutane. A microemulsion was made up of equal amounts of isobutane solution; kerosene solution; and water containing 3%, by weight, sodium sulfate. At room temperature, the microemulsion was almost transparent and very viscous.

EXAMPLE VI

A hydrocarbon solution was made up of 15.2% sulfonate surfactant, 5.0% isopropyl alcohol, and 79.8% butane. A like solution was made up by substituting kerosene for butane. To formulate a microemulsion, equal parts of the butane solution and kerosene solution were made up. Forty-five percent water containing 3%, by weight, sodium sulfate was utilized to make a microemulsion which was clear and stable at room temperature. Variation of the kerosene and butane contents provided additional clear microemulsions where reduced amounts of water (containing sodium sulfate) were used to make up the desired microemulsion systems.

Now having described our invention, what we claim is:

1. The process for the recovery of oil from subterranean oil-bearing formations comprising injecting into said formation through at least one injection means a microemulsion comprising liquefied petroleum gas, a high molecular weight hydrocarbon, at least one surfactant and water; thereafter injecting into said formation a drive fluid; driving said microemulsion toward at least one production means in said formation; and recovering displaced hydrocarbon.

2. The process of claim 1 wherein the microemulsion contains from about 20 to about 80% liquefied petroleum gas and from about 5 to an excess of 40% high molecular weight hydrocarbons.

3. The process of claim 1 wherein the microemulsion is injected in a volume comprising from about 1 to about 20% of the pore volume of the formation.

4. The process of claim 1 wherein the volume of microemulsion injected comprises from about 3 to about 10% of the pore volume of the formation.

5. Microemulsions comprising from about 0 to about 45% water, from about 20 to about 80% liquefied petroleum gas, from about 5 to about 40% higher molecular weight hydrocarbons, and up to about 20% surfactant.

6. The microemulsions of claim 5 wherein the microemulsion contains from about 15 to about 35% water, from about 30 to about 60% liquefied petroleum gas, and from about 10 to about 35% higher molecular weight hydrocarbon.

7. The microemulsions of claim 5 containing up to about 10% cosurfactant.

8. The microemulsions of claim 5 containing up to about 6% cosurfactant.

References Cited

UNITED STATES PATENTS

| | | | |
|---|---|---|---|
| 2,331,594 | 10/1943 | Blair et al. | 252—8.55 |
| 3,149,669 | 9/1964 | Binder et al. | 166—9 |
| 3,163,214 | 12/1964 | Csaszar | 166—9 |
| 3,254,714 | 6/1966 | Gogarty et al. | 166—9 |
| 3,275,075 | 9/1966 | Gogarty et al. | 166—9 |
| 3,297,085 | 1/1967 | Herring | 166—9 |

STEPHEN J. NOVOSAD, *Primary Examiner.*